United States Patent [19]

Moore

[11] 4,075,470
[45] Feb. 21, 1978

[54] EMERGENCY LAMP
[76] Inventor: Charles R. Moore, Mishawaka, Ind.
[21] Appl. No.: 643,073
[22] Filed: Dec. 22, 1975
[51] Int. Cl.² .......................... F21L 15/18; B60Q 1/52
[52] U.S. Cl. .................................... 362/287; 362/387; 362/398
[58] Field of Search ................. 240/52.15, 8.18, 52 R, 240/81 R, 81 BS, 81 BA, 81 BC, 41 SB; 248/206 A, 166, 439; 340/50, 87; 224/42.1 R

[56] References Cited
U.S. PATENT DOCUMENTS

| 1,367,369 | 2/1921 | Friend | 248/166 X |
| 1,915,967 | 6/1933 | Bailey | 240/52 R X |
| 2,165,562 | 7/1939 | Mack et al. | 240/8.18 |
| 2,197,637 | 4/1940 | Goldberg | 240/3.1 X |
| 2,508,071 | 5/1950 | Martin et al. | 240/8.18 X |
| 2,875,324 | 2/1959 | Camp et al. | 240/52.15 |
| 2,894,693 | 7/1959 | Howarth | 240/3 X |
| 3,103,314 | 9/1963 | Heisler | 240/1.3 |
| 3,124,057 | 3/1964 | Kiser | 248/166 X |
| 3,325,639 | 6/1967 | King | 248/206 A |
| 3,439,159 | 4/1969 | McRoskey et al. | 240/52.15 X |

Primary Examiner—L. T. Hix
Assistant Examiner—Stafford Schreyer
Attorney, Agent, or Firm—Blanchard, Flynn, Thiel, Boutell & Tanis

[57] ABSTRACT

A portable electric lamp generally designed to connect to the electrical supply system in an automobile. The portable electric lamp as a base and a pair of feet pivotally secured to the base at spaced locations thereon and about parallel axes. A U-shaped bracket having a pair of upstanding and parallel legs and a bight portion is pivotally secured to the base for movement about a first pivot axis. A lamp holding casing is received between the upstanding legs of the bracket and is pivotally connected to each of the legs of the bracket to support the lamp holding casing for moving about a second pivot axis perpendicular to the first pivot axis. The lamp holding casing includes structure for releasably holding at least one lamp or sealed beam bulb therein. An electrical cord having an electrical probe thereon is provided for connecting the lamp to a source of electrical energy.

13 Claims, 10 Drawing Figures

EMERGENCY LAMP

FIELD OF THE INVENTION

This invention relates to a portable electric lamp and, more particularly, relates to a portable electric lamp housing at least one sealed beam bulb and is further adapted to mount onto a contoured surface and having a support structure for facilitating an adjustment of the lamp relative to the surface.

BACKGROUND OF THE INVENTION

A need has arisen for portable lamps for use in lighting up large areas in situations of nighttime emergencies and disasters. Lights are known to exist which are permanently affixed to vehicles, sometimes referred to as spotlights, and which can be used to illuminate large areas during the night. However, such fixtures are expensive to install, and when the vehicle is sold, must remain with the vehicle.

It is an object of this invention to provide a portable electric lamp which can be removably attached to a surface of a vehicle, for example, for use in illuminating large areas during nighttime emergencies and disasters.

It is a further object of this invention to provide a portable electric lamp, as aforesaid, wherein the electrical supply therefor is achieved through the use of an electrical socket normally provided in most automobiles.

It is a further object of this invention to provide a portable electric lamp, as aforesaid, wherein the feet have permanent magnets asociated therewith so that the feet will be magnetically attached to a surface of a vehicle. It is a further object of this invention to provide the feet, as aforesaid, on pivotal supports so that the feet can be adjusted to varying contours on external surfaces of vehicles.

It is a further object of this invention to provide a portable electric lamp, as aforesaid, having a storage compartment therein for storing an appreciable length of electrical cord which is used to supply electrical energy to the lamp.

It is a further object of this invention to provide a portable electric lamp, as aforesaid, having an electrical auxiliary outlet thereon for receiving an electrical connector from another of a like lamp to supply electrical energy thereto in parallel with the first-mentioned lamp.

It is a further object of this invention to provide a portable electric lamp having a pair of lamps mounted thereon in a back-to-back manner with control circuitry being provided to control each of the lamps independent of the other. It is still a further object of this invention to make one of the aforesaid lamps a red light and the other a white light.

It is an object of this invention to provide a portable electric lamp, as aforesaid, wherein the lamp has a flasher control member to facilitate a flashing of the lamp.

It is a further object of this invention to provide a portable electric lamp, as aforesaid, which is of a rugged construction and capable of absorbing much abuse in the field.

SUMMARY OF THE INVENTION

In general, the objects and purposes of the invention are met by providing a portable electric lamp having a base and a pair of feet pivotally secured to the base at spaced locations thereon and about parallel axes. A U-shaped bracket is provided having a pair of upstanding and parallel legs and a bight portion connecting the legs. A first pivotal connection is provided for connecting the bight portion of the bracket to the base and for movement about a first pivot axis. A lamp holding casing is received between the upstanding legs of the bracket and includes holding means for releasably holding at least one lamp therein. A second pivot connection is provided to connect the lamp holding casing to each of the legs to support the casing for movement about a second pivot axis perpendicular to the first pivot axis. Electrical supply connection means are provided for connecting the lamp to a source of electrical energy.

Further objects and purposes of this invention will be apparent to persons acquainted with apparatus of this general type upon reading the following specification and inspecting the accompanying drawings.

Figure 1:
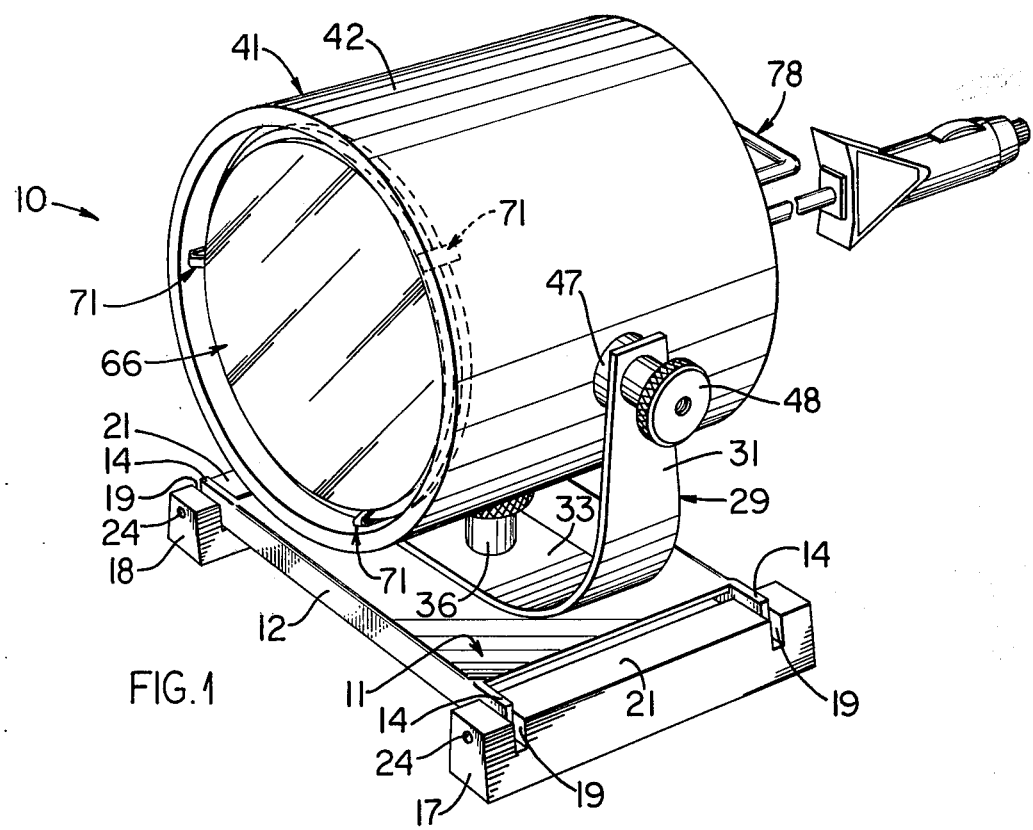
FIG. 1 is a perspective view of the lamp embodying my new invention.

Certain terminology will be used in the following description for convenience in reference only and will not be limiting. The words "up", "down", "right" and "left" will designate directions in the drawings to which reference is made. The words "front" and "rear" will refer to the front and rear of the lamp, the front being the right side of FIG. 3, the rear being the left side of FIG. 3. The words "in" and "out" will refer to directions toward and away from, respectively, the geometric center of the device and designated parts thereof. Such terminology will include the words above specifically mentioned, derivatives thereof and words of similar import.

DETAILED DESCRIPTION

Figure 2:
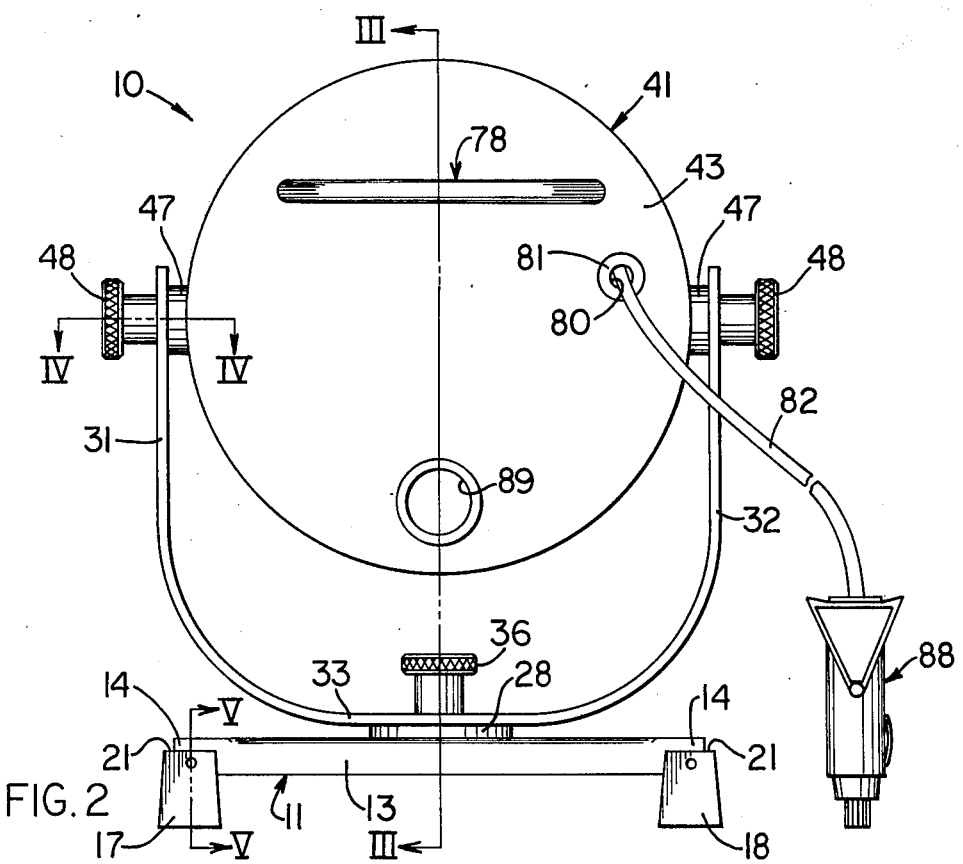
FIG. 2 is a rear elevational view of the lamp.
Figure 3:
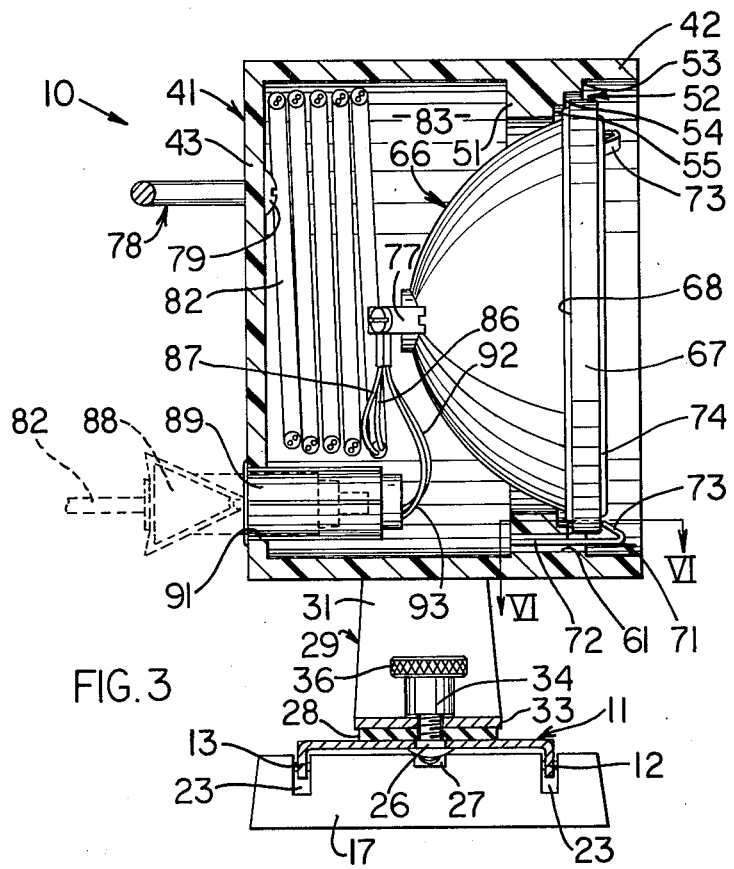
FIG. 3 is a sectional view taken along the line III—III of FIG. 2.

One embodiment of a portable electric lamp 10 embodying my new invention is illustrated in FIGS. 1 to 3. The lamp 10 includes a rectangular-shaped base plate 11 having a flat part and a downwardly extending front flange 12 and a downwardly extending rear flange 13 on the front and rear edges of the flat part. The side-to-side width of the base plate 11 is less than the side-to-side length of the front and rear flanges 12 and 13 to define four laterally projecting tabs 14 at each corner of the rectangular base plate 11. The two sets of tabs 14 on the sides of the base plate each have a hole 16 therethrough, which holes 16 are axially aligned with each other.

A pair of elongated feet 17 and 18 are each pivotally secured to the tabs 14 on the base plate 11. More specifically, each foot 17 and 18 has a pair of parallel slots 19 therein, which slots 19 extend crosswise of the longitudinal axis of the elongated feet 17 and 18. The depth of the slots are sufficient to receive the tabs therein so that the holes 16 are located beneath the upper surface 21 of each of the feet 17 and 18. In this particular embodiment, holes 22 are drilled into each of the feet 17 and 18 from the front and rear ends thereof and extend in a direction parallel to the plane of the uper surfaces 21 on each of the feet 17 and 18. The holes 22 are adapted to become aligned with the holes 16 in the tabs 14 when the tabs 14 are received into the slots 19. In addition, a clearance 23 is provided between the tabs 14 and the bottom wall of the slots 19 to facilitate a pivotal movement of each of the feet 17 and 18 without interference with the surfaces defining the slots 19. Pins 24 are received in each of the holes 22 in the feet 17 and 18 and through the holes 16 in the tabs 14 to pivotally secure each of the feet 17 and 18 to the tabs 14 about the axis of the pins 24. A permanent magnet 25 is secured to the feet 17 and 18 and is pivotal therewith.

A threaded member 26 (FIG. 3) having an external thread thereon is secured by any convenient means, such as a clip 27, to the flat portion of the base 11 between the downwardly extending flanges 12 and 13. The externally threaded member 26 projects upwardly from the upper surface of the base member 11. A resilient, here a rubber, friction ring 28 encircles the upwardly extending portion of the threaded member 26 and rests on the upper surface of the flat portion of the base plate 11.

Figure 4:
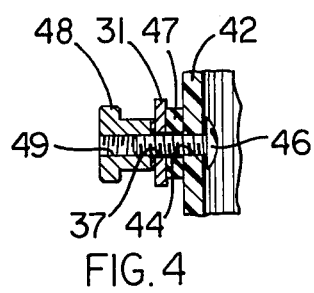
FIG. 4 is a sectional view taken along the line IV—IV of FIG. 2.
Figure 5:
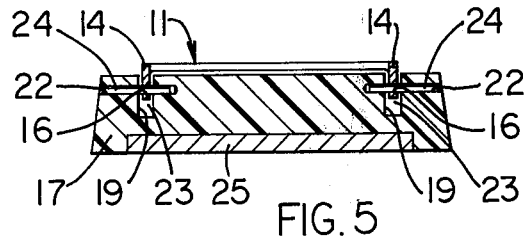
FIG. 5 is a sectional view taken along the line V—V of FIG. 2.

A U-shaped bracket 29 has a pair of upstanding and generally parallel legs 31 and 32 and an interconnecting bight portion 33 connecting the lower ends of the legs 31 and 32. A hole 34 is provided in the bight portion 33 and the threaded member 26 is received through the hole 34 so that the bight portion 33 rests on top of the friction member 28. A knurled knob 36 having an internal thread therein threadedly engages the external thread on the threaded member 26 on the upper side of the bight portion 33 so that upon a tightening of the knurled knob 36 onto the threaded member 26, the friction ring 28 will be clamped between the bight portion 33 and the upper surface of the base plate 11 to thereby prevent a relative movement of the U-shaped bracket 29 about the vertical axis defined by the threaded member 26. Each of the legs 31 and 32 of the U-shaped bracket 29 has an opening 37 therethrough (only one hole 37 being shown in FIG. 4). The purpose of these openings will be explained below.

A lamp holding casing 41 includes a hollow cylindrical body 42 and an end wall 43 closing off one end thereof. The cylindrical body 42 has a pair of diametrically opposed openings 44 therethrough (only one opening 44 being shown in FIG. 4). An externally threaded member, here a conventional screw 46, is received in each of the openings 44 and extends outwardly of the body 42. A resilient, here rubber, friction ring 47 encircles the threaded portion of each of the screws 46 and is positioned between the legs 31 and 32 and the cylindrical body 42 of the lamp holding casing 41. A knurled knob 48 having an internal thread 49 therein is threadedly engaged with the external thread 65 on the screw 46 so that upon a tightening of the knurled knob 48 onto the respective screws 46, the friction ring 47 will become clamped between a respective leg 31, 32 of the U-shaped bracket 29 and the cylindrical body 42 of the lamp holding casing 41 to thereby prevent a relative movement of the lamp holding casing 41 relative to the legs 31 and 32 of the U-shaped bracket 29.

The hollow cylindrical body 42 has an inwardly projecting and annular flange 51 adjacent the front edge thereof. The frontwardly facing surface of the flange 51 is stepped as at 52 to define a plurality of frontwardly facing surfaces 53, 54 and 55. The surfaces 54 and 55 are recessed from the front edge 56 of the body 42 a distance further than is the surface 53 and, similarly, the surface 55 is recessed a distance further from the front edge 56 than is the surface 54.

A plurality of holes 61 are provided in the surface 53 and extend in a direction parallel to the longitudinal axis of the body 42. In this particular embodiment, three holes 61 are provided in the surface 53 and are equally spaced from each other. A frontwardly extending protuberance 62 is provided on the surface 54 adjacent each of the holes 61. In other words, there are three protuberances provided on the surface 54, each adjacent the holes 61 and are equally spaced around the surface 54. The frontwardlymost portion of the protuberance 62 is spaced closer to the front edge of the body 42 than is the surface 54.

Figure 6:
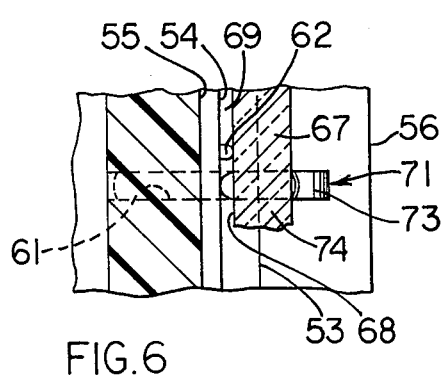
FIG. 6 is a sectional view taken along the line VI—VI of FIG. 3.

A conventional sealed beam bulb 66 is received inside the hollow cylindrical body 42 as illustrated in FIG. 3. The sealed beam bulb has an annular rim 67 thereon which is greater in diameter than the stepped surface portion 55 but less in diameter than the stepped surface portion 54 and the stepped surface portion 53. The holes 61 are spaced on a radius which is greater than the radius of the rim 67. The protuberances 62 are, however, on a radius which is less than the radius of the rim 67. As a result, the rear edge 68 of the rim 67 engages the frontwardlymost projecting part of the protuberances 62 as illustrated in FIG. 6. A gap 69 is thereby defined between the rear edge 68 of the rim 67 and the frontwardly facing surfaces 54 and 55 on the flange 52. As a result, air will be permitted to circulate past the sealed beam bulb 66 when same is mounted in the body 42.

The sealed beam bulb 66 is secured to the body 42 by a plurality, here three, hook or J-shaped members 71. Each hook or J-shaped member 71 has a long leg 72 and a short leg 73 (FIG. 3). The long leg 72 is adapted to be received into the holes 61 with the short leg 73 engaging the front edge 74 of the rim 67 of the sealed beam bulb 66. The width of the J-shaped member 71 is equal to or slightly greater than the diameter of the holes 61 so that the long leg 72 is held into each of the holes 61 by a friction fit.

Figure 7:
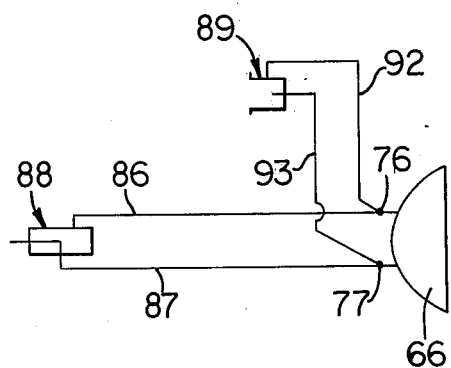
FIG. 7 is an electrical schematic diagram of an electrical circuit incorporated into the lamp illustrated in FIGS. 1 to 3.

The rear portion of the sealed beam bulb 66 has a pair of terminals 76 and 77 (FIG. 7). Only the terminal 77 is illustrated in FIG. 3.

In this particular embodiment, the rear wall 43 of the lamp holding casing 41 is integral with the cylindrical body 42. A handle 78 is secured to the rear wall by screws 79 and projects rearwardly therefrom. An opening 80 is provided in the rear wall and is encircled by a grommet 81, preferably made of plastic. The opening 80 provides communication between the exterior of the casing 41 and the interior portion of the body 42 and a chamber 83 immediately to the rear of the sealed beam bulb 66. An elongated electrical cord 82 is slidably received in the opening 80. The cord 82 is capable of being pushed from the outside through the opening 80 into the chamber 83 immediately to the rear of the sealed beam bulb 66 as best illustrated in FIG. 3. As a result, the entire length of the elongated cord 82 can be stored in the chamber 83 due to the spacing between the terminals 76 and 77 on the rear surface of the sealed beam bulb 66 and the rear wall 43. The electrical cord 82 contains two wires 86 and 87, each of which is secured to one of the terminals 76 and 77 (FIG. 7) on the rear of the sealed beam bulb 66. The wires 86 and 87 are secured at an end remote from the terminals 76 and 77 to an electrical probe 88 in a conventional manner. In addition, an electrical socket 89, similar to the socket for the cigarette lighter in an automobile, is mounted in an opening 91 in the rear wall 43 of the lamp holding casing 41. A pair of wires 92 and 93 are connected to and extend between the terminals 76 and 77 on the sealed beam bulb 66 and the socket 89. In other words, the electrical wiring of the socket is connected in parallel with the sealed beam bulb 66.

A source of electrical energy is not illustrated but it is to be understood that the electrical socket draws its power from the battery on the vehicle.

ALTERNATE CONSTRUCTION

Figure 8:
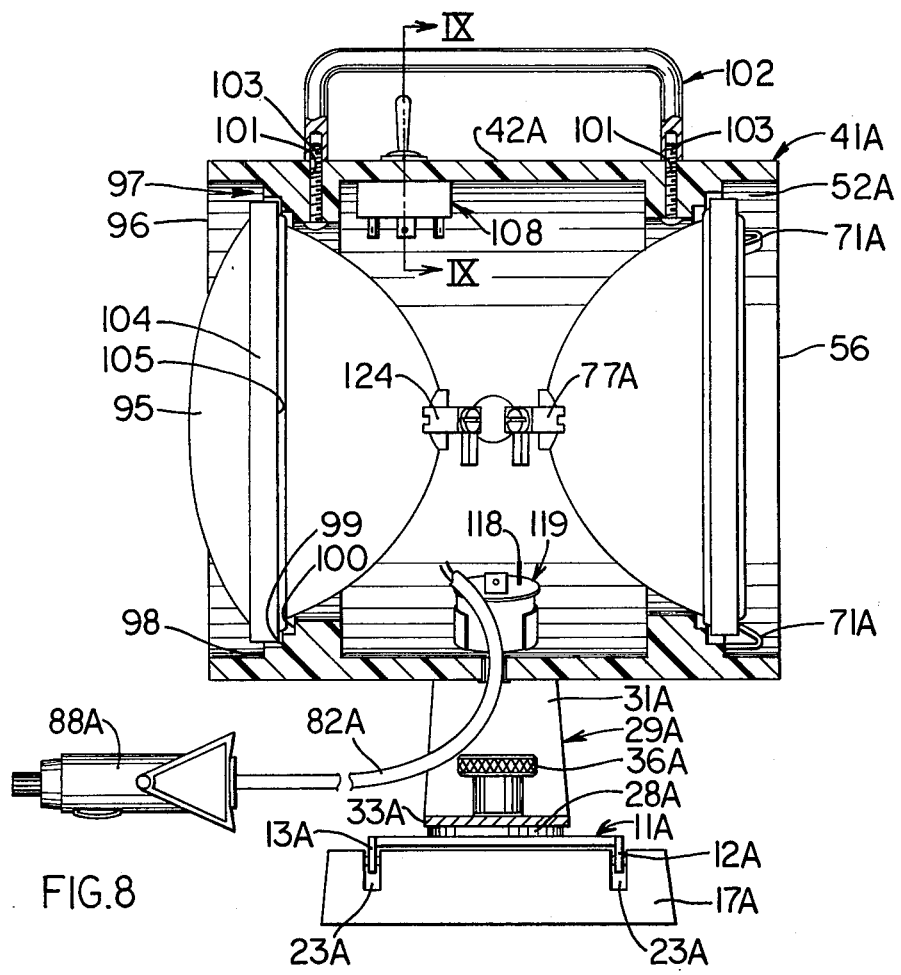
FIG. 8 is an alternate construction of a portable electric lamp embodying my new invention.
Figure 9:
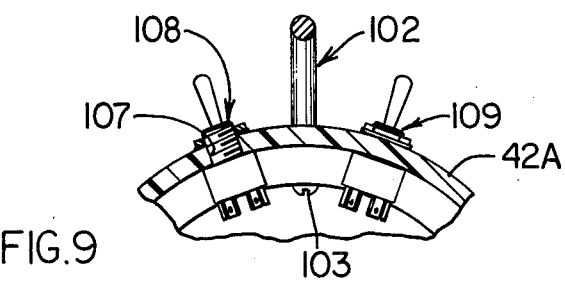
FIG. 9 is a sectional view taken along the line IX—IX of FIG. 8.
Figure 10:
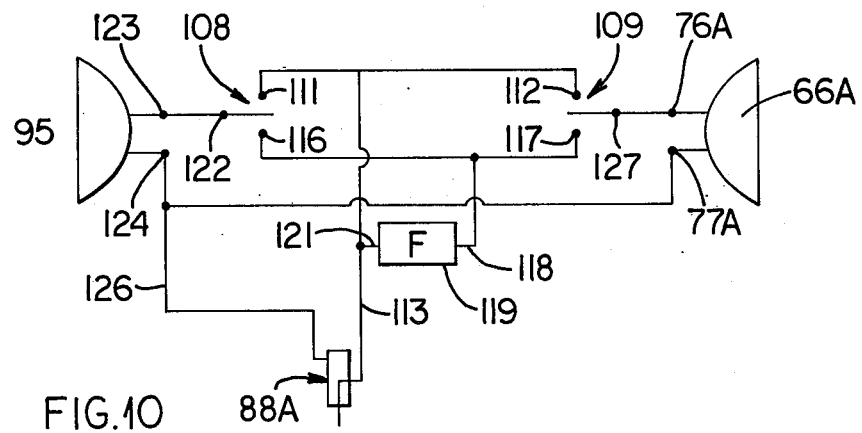
FIG. 10 is an electrical schematic diagram of an electrical circuit incorporated into the lamp illustrated in FIG. 8.

An alternate embodiment is illustrated in FIGS. 8 to 10. The reference numerals utilized above for describing identical components will be shown in FIGS. 8 to 10 as the same reference numerals but with the suffix "A" added thereto. No further discussion of these identical components will be presented.

The feature which is not illustrated in FIG. 8 is the connection of the lamp holding casing 41A to the upper free ends of the legs 31A and 32A of the U-shaped bracket 29A. The pivotal connection is exactly the same as has been described above with respect to the embodiment of FIGS. 1 to 7. Accordingly, further comment about the pivotal connection at this point is believed unnecessary.

The lamp holding casing 41A has a hollow cylindrical body part 42A which, in this embodiment, is opened at both ends. The sealed beam bulb 66A is secured to the flange 51A by a plurality of J-shaped members 71A in a manner identical to that described above with respect to the securement of the sealed beam bulb 66 to the flange 51A. Accordingly, further comment about this connection is believed unnecessary. In this particular embodiment, however, a second annular flange 94 is provided inside the body 42A adjacent the rear edge 96 of the body 42A. The rearwardly facing surface of the flange 96 is stepped as at 97 to define a plurality of rearwardly facing surfaces 98, 99 and 100. The surfaces 99 and 100 are spaced frontwardly from the rear edge 96 of the body 42A a distance further than is the surface 98 and, similarly, the surface 100 is spaced frontwardly a distance further from the rear edge 96 than is the surface 99.

A plurality of holes (not illustrated) identical in kind to the holes 61 are provided in the surface 98 and extend in a direction parallel to the longitudinal axis of the body 42. In this particular embodiment, three not illustrated holes are provided around the surface 98 and are equally spaced from each other. A protuberance (also not illustrated) identical in kind to the protuberances 62 is provided on the surface 99 adjacent each of the openings. In other words, there are three protuberances provided on the surface 99 each adjacent the holes and are equally spaced around the surface 99.

A pair of holes 101 extend radially of the lamp holding casing 41A through the annular flanges 51A and 94.

A handle 102 is secured to screws 103 extending through the openings 101.

A sealed beam bulb 95 is received inside the hollow cylindrical body 42A. The sealed beam bulb 95 has an annular rim 104 similar to the rim 67A and which is greater in diameter than the stepped surface portion 100 but is less in diameter than the stepped surface portion 99 and the stepped surface portion 98. As has been described above with respect to the sealed beam bulb 66 in the embodiment of FIGS. 1 to 7, the not illustrated holes in the surface 98 are spaced on a radius which is greater than the radius of the rim 104. The not illustrated protuberances are, however, on a radius which is less than the radius of the rim 104. As a result, the rear edge 105 of the rim 104 engages the rearwardlymost projecting part of the protuberances and define a gap 106 therebetween. As a result, air will be permitted to circulate past the sealed beam bulb 95 when same is mounted in the body 42A.

Not illustrated hook or J-shaped members, identical to the hook or J-shaped members 71 in the embodiment of FIGS. 1 to 7 are utilized to secure a sealed beam bulb 95 to the lamp holding casing 41A. The structure of the J-shaped members is the same and cooperates in the same manner with the holes provided in the rearwardly facing surface 98. Accordingly, further discussion about the means for securing the sealed beam bulb 95 to the lamp holding casing 41A is believed unnecessary.

A pair of holes 107 are placed radially into the body part 42A adjacent the handle 102 but on opposite sides thereof as illustrated in FIG. 9. Toggle swithes 108 and 109 are mounted in the holes 107 and are secured therein in a conventional manner. The toggle switches are each three position switches.

Referring now to FIG. 10, the neutral or "off" position for each of the switches 108 and 109 is illustrated in the circuit diagram. The contacts 111 and 112 of the switches 108 and 109, respectively, are connected together and through a line 113 to the electrical probe 88A. Similarly, the contacts 116 and 117 of the switches 108 and 109, respectively, are connected together and to a terminal 118 of a flasher control unit 119. The other terminal 121 of the flasher control unit 119 is secured to the line 113. The contact 122 of the toggle switch 108 is connected to a terminal 123 on the sealed beam bulb 95. The other terminal 124 of the sealed beam bulb 95 is connected to the terminal 77A of the sealed beam bulb 66A and through a line 126 to the electrical probe 88A. The contact 127 of the switch 109 is connected to the terminal 76A of the sealed beam bulb 66A. As a result, when the toggle switch 108 is operated so that the contact 122 is electrically connected to the contact 111 and the electrical probe 88A is connected to a source of electrical energy, the sealed beam bulb 95 will be continuously illuminated. A movement of the toggle switch so that the contact 122 is in electrical contact with the contact 116 will effect a flashing of the sealed beam bulb 95 since electrical power is supplied thereto through the line 113, the flasher control unit 119, and thence to the terminal 123.

Similarly, the sealed beam bulb 66A will function in a like manner, namely an electrical contact in the switch 109 between the contacts 127 and 112 will effect a continuous operation of the sealed beam bulb 66A and an electrical contact between the contacts 127 and 117 will effect a flashing operation of the sealed beam bulb 66A.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A portable electric lamp, comprising:
    base means including a flat rectangular-shaped plate;
    a pair of feet pivotally secured to said base means at spaced locations thereon along parallel side edges of said plate and about parallel axes, said parallel side edges of said plate each having a pair of spaced and laterally outwardly and parallel extending tabs thereon each having a first hole therethrough, each of said feet having a pair of parallel slots in a surface thereof, said slots having a sufficient depth to receive said tabs therein so that said hole is beneath said surface, each of said feet adjacent said slots having second holes therein, said second holes opening into said slots and the axis of each of said second holes extending perpendicular to the longitudinal axis of said slots, said second holes being aligned with said first holes;
    at least one pin received in said aligned first and second holes on each foot for pivotally securing each one of said feet to said tabs;
    a U-shaped bracket having a pair of upstanding and parallel legs and a bight portion connecting said legs;
    first pivot means pivotally connecting said bight portion of said bracket to said base means and for movement about a first pivot axis;
    lamp holding casing means received between said upstanding legs of said bracket and including holding means for releasably holding at least one lamp therein;
    second pivot means pivotally connecting each of said legs of said bracket to said lamp holding casing means and effecting a movement of said lamp holding casing means about a second pivot axis perpendicular to said first pivot axis; and
    electrical supply connection means for connection between said lamp and a source of electrical energy.

2. A portable electric lamp according to claim 1, wherein each of said pair of feet include permanent magnets therein.

3. A portable electric lamp according to claim 1, wherein said first pivot means includes an opening in said bight portion of said bracket and a fastening means extending through said opening for securing said bracket to said base means and a resilient friction ring encircing said fastening means and positioned between said base means and said bracket, a tightening of said fastening means effecting a clamping of said friction ring between said bracket and said base means to brake the relative movement therebetween.

4. A portable electric lamp according to claim 1, wherein said second pivot means includes an opening in each of said legs of said bracket adjacent the free ends thereof and aligned with each other and fastening means on each side of said lamp holding casing means extending through said openings for securing said lamp holding casing means to said bracket and a resilient friction ring encircling each of said fastening means and positioned between said lamp holding casing means and said legs of said bracket, a tightening of said fastening means effecting a clamping of said friction ring between said lamp holding casing means and a respective one of said legs of said bracket to thereby effect a braking of the relative movement therebetween.

5. A portable electric lamp according to claim 1, wherein said electrical supply connection means includes an electrical cord having a probe on one end adapted to be received in an electrical socket in an automotive electrical system.

6. A portable electric lamp according to claim 5, wherein said lamp holding casing means includes storage means for storing said electrical cord therein and a hole communicating with said storage means and through which said cord is received to permit a movement of said cord into or out of said storage means.

7. A portable electric lamp according to claim 1, wherein said electrical supply connection means includes an electrical socket; and
    wherein said lamp holding casing means includes support means for holding said electrical socket thereon, said electrical socket facilitating a connection of another of said portable electrical lamps thereto.

8. A portable electric lamp according to claim 1, wherein said lamp holding casing means includes support means for supporting a pair of lamps back-to-back; and
    wherein said electrical supply connection means includes a pair of switches for controlling each of said lamps independent of the other.

9. A portable electric lamp according to claim 8, wherein at least one of said lamps has an electrical flasher control element connected thereto to effect a flashing of said one lamp.

10. A portable electric lamp according to claim 1, wherein said lamp holding casing means has a handle secured thereto.

11. A portable electric lamp according to claim 1, wherein said lamp is a sealed beam bulb.

12. A portable electric lamp, comprising:
    base means;
    a pair of feet pivotally secured to said base means at spaced locations thereon and about parallel axes;
    a U-shaped bracket having a pair of upstanding and parallel legs and a bight portion connecting said legs;
    first pivot means pivotally connecting said bight portion of said bracket to said base means and for movement about a first pivot axis;
    lamp holding casing means received between said upstanding legs of said bracket and including holding means for releasably holding at least one lamp therein and includes a body part spacer means adapted to engage said lamp to space said lamp away from said body part to facilitate the flow of air around said lamp for cooling purposes, said body part spacer means comprising small protuberances integral with said body part of said lamp holding casing means and are positioned to engage only the rim of said lamp;
    second pivot means pivotally connecting each of said legs of said bracket to said lamp holding casing means and effecting a movement of said lamp holding casing means about a second pivot axis perpendicular to said first pivot axis; and
    electrical supply connection means for connection between said lamp and said source of electrical energy.

13. A portable electric lamp according to claim 12, wherein said holding means includes a recess positioned adjacent each of said protuberances, the axis of said recess extending in a direction parallel to the axis of said protuberances and a J-shaped member having a long leg and a short leg, said long leg being received in said recess with said short leg engaging said rim of said lamp but on a side thereof remote from protuberances on said lamp holding casing means.

* * * * *